(12) United States Patent
Cheng

(10) Patent No.: US 7,913,372 B2
(45) Date of Patent: Mar. 29, 2011

(54) INSULATED COOKING VESSEL

(75) Inventor: Stanley Kin Sui Cheng, Vallejo, CA (US)

(73) Assignee: Meyer Intellectual Properties Limited (VG)

( * ) Notice: Subject to any disclaimer, the term of this patent is extended or adjusted under 35 U.S.C. 154(b) by 565 days.

(21) Appl. No.: 11/953,153

(22) Filed: Dec. 10, 2007

(65) Prior Publication Data

US 2008/0156810 A1 Jul. 3, 2008

Related U.S. Application Data

(60) Provisional application No. 60/871,357, filed on Dec. 21, 2006.

(51) Int. Cl.
*B21D 39/00* (2006.01)
(52) U.S. Cl. .......................................................... 29/505
(58) Field of Classification Search ............... 29/505, 29/506, 509, 510, 512, 515
See application file for complete search history.

(56) References Cited

U.S. PATENT DOCUMENTS

| | | | | |
|---|---|---|---|---|
| 1,093,648 A * | 4/1914 | Potter | ............... | 220/592.22 |
| 1,459,023 A * | 6/1923 | Guest | ............... | 215/12.1 |
| 1,927,686 A * | 9/1933 | Kapner | ............... | 219/433 |
| 2,517,584 A * | 8/1950 | Mapes et al. | ............... | 72/47 |
| 2,518,483 A * | 8/1950 | Mapes | ............... | 72/47 |
| 3,934,748 A * | 1/1976 | Racz | ............... | 99/447 |
| 3,979,572 A * | 9/1976 | Ito et al. | ............... | 219/621 |
| 4,204,609 A * | 5/1980 | Kuhn | ............... | 220/573.1 |
| 4,595,120 A * | 6/1986 | Logan et al. | ............... | 220/573.1 |
| 4,653,469 A * | 3/1987 | Miyaji et al. | ............... | 126/390.1 |
| 4,790,292 A * | 12/1988 | Kuhn | ............... | 219/621 |
| 5,348,187 A * | 9/1994 | Schultz | ............... | 220/752 |
| 5,532,461 A * | 7/1996 | Crummenauer et al. | ...... | 219/621 |
| 6,576,876 B2 * | 6/2003 | Cartossi | ............... | 219/621 |
| 7,097,064 B2 * | 8/2006 | Cheng et al. | ............... | 220/573.1 |
| 2005/0161458 A1 * | 7/2005 | Cheng et al. | ............... | 220/573.1 |
| 2005/0205646 A1 * | 9/2005 | Cheng | ............... | 228/101 |
| 2006/0289487 A1 * | 12/2006 | Tarenga | ............... | 219/621 |

FOREIGN PATENT DOCUMENTS

CH 690747 A5 1/2001
JP 08112207 A 5/1976

* cited by examiner

*Primary Examiner* — David P Bryant
*Assistant Examiner* — Jacob J Cigna
(74) *Attorney, Agent, or Firm* — Edward S. Sherman

(57) ABSTRACT

A dual wall cooking vessel has an inner cooking portion or shell with a thermally conductive outer cladding that terminates prior to the interior of the rim of the cooking vessel. The construction provides uniform temperature during the cooking process, yet minimizes heat loss after cooking.

20 Claims, 5 Drawing Sheets

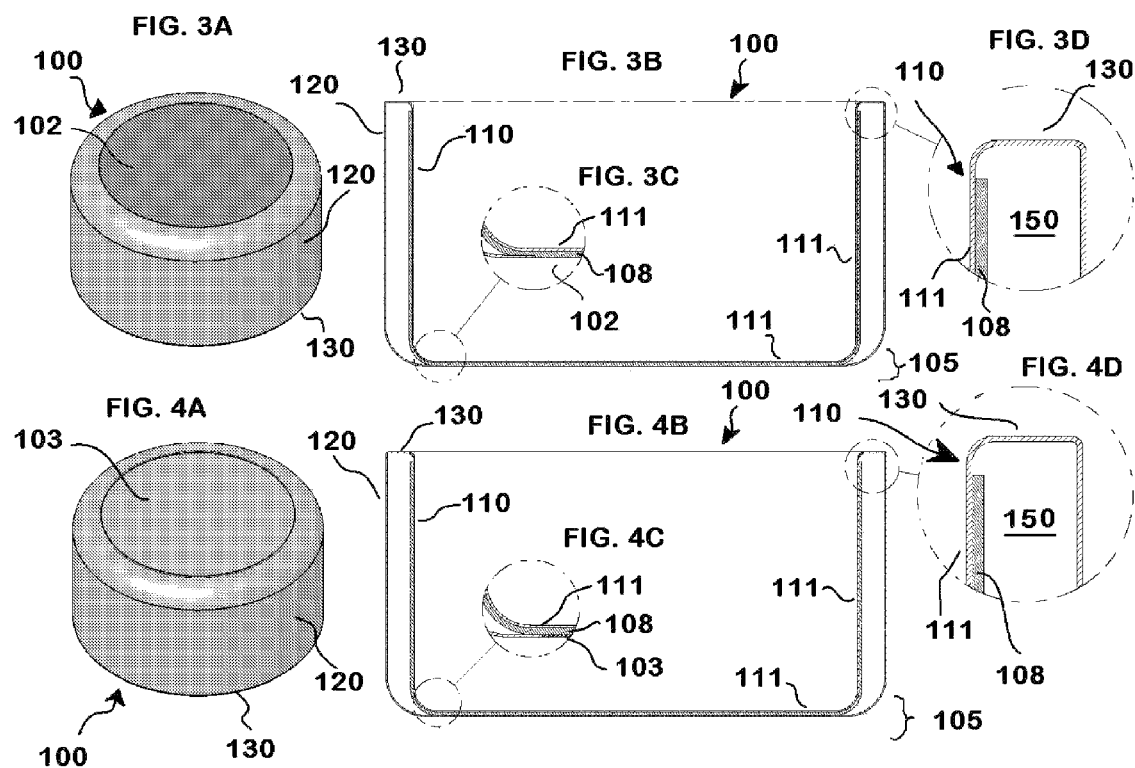

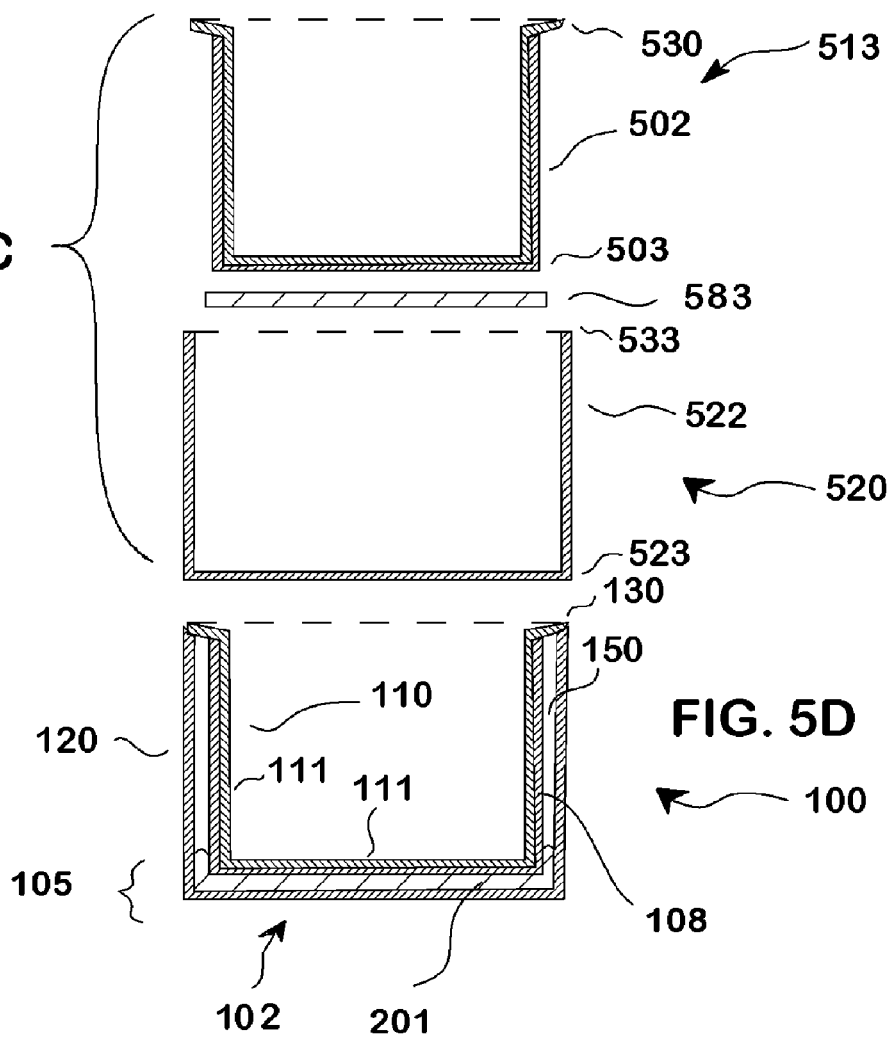

INSULATED COOKING VESSEL

CROSS REFERENCE TO RELATED APPLICATIONS

The present application claims priority to the U.S. provisional patent application having Ser. No. 60/871,357, which was filed on 21 Dec. 2006 under the title "Insulated Cooking Vessel", which is incorporated herein by reference.

BACKGROUND OF INVENTION

The present invention relates to an improved article of cookware, and in particular a cooking vessel having hollow sidewalls for insulation.

Prior methods of forming a cooking vessels having hollow walls for insulation involves a separate forming and bonding of two cookware vessels.

Prior forms of hollow wall cooking vessels have inferior cooking performance to the extent that the most of the heating of the foodstuffs is that the bottom of the cookware vessel, as the sidewalls are not intended to conduct heat, but rather provide insulation.

It is therefore a first object of the present invention to provide improved hollow wall cooking vessels wherein the cooking performance is not compromised by the insulating qualities, and the insulating qualities are not compromised by the cooking performance.

It is a further objective of the present invention to provide a method for forming such a cookware article.

It is still yet another object of the present invention to provide a method of forming a cookware article having attributes of the other objectives wherein the process of welding is not required to seal the hollow wall. A still further objective of the present invention is to provide a method of forming a cookware article having the attributes of the other objectives wherein there is provided in the lower portion of the sidewalls between the inner and outer vessel a sufficient mass of thermally conductive material to avoid damage or discoloration from the heating element or flame.

SUMMARY OF INVENTION

In the present invention, the first object is achieved by providing a dual wall cooking vessel having a sealed insulating gap between the interior and exterior wall wherein the interior wall is a laminated structure with a substantially thermally conductive laminated layer facing the sealed insulating gap.

A second aspect of the invention is characterized in that the hollow wall cooking vessel is formed by first drawing a high walled vessel from one or more planar sheet of metals, and then reversed rolling the central portion of the bottom of the high walled vessel wherein the upper portion of the wall in the initial vessel becomes the exterior wall of the dual walled vessel and the lower portion of the high wall becomes the interior wall of the dual walled vessel.

The above and other objects, effects, features, and advantages of the present invention will become more apparent from the following description of the embodiments thereof taken in conjunction with the accompanying drawings.

BRIEF DESCRIPTION OF DRAWINGS

FIG. 3A is a perspective view of a cooking vessel according to another embodiment of the invention inverted to show the exterior bottom cooking surface. FIG. 3B is an upright cross-sectional elevation to the vessel shown in FIG. 3A. FIG. 3C. is an expanded view of the bottom corner of the cooking vessel shown in FIG. 3B, whereas FIG. 3D is an expanded view of the rim portion of the cooking vessel shown in FIG. 3B.

FIG. 4A is a perspective view of a cooking vessel according to another embodiment of the invention inverted to show the exterior bottom cooking surface. FIG. 4B is an upright cross-sectional elevation to the vessel shown in FIG. 4A. FIG. 4C. is an expanded view of the bottom corner of the cooking vessel shown in FIG. 4B, whereas FIG. 4D is an expanded view of the rim portion of the cooking vessel shown in FIG. 4B.

FIG. 5A-D are a sequence of cross-sectional elevations showing an alternative method of forming an embodiment of the invention.

DETAILED DESCRIPTION

Figure 1:
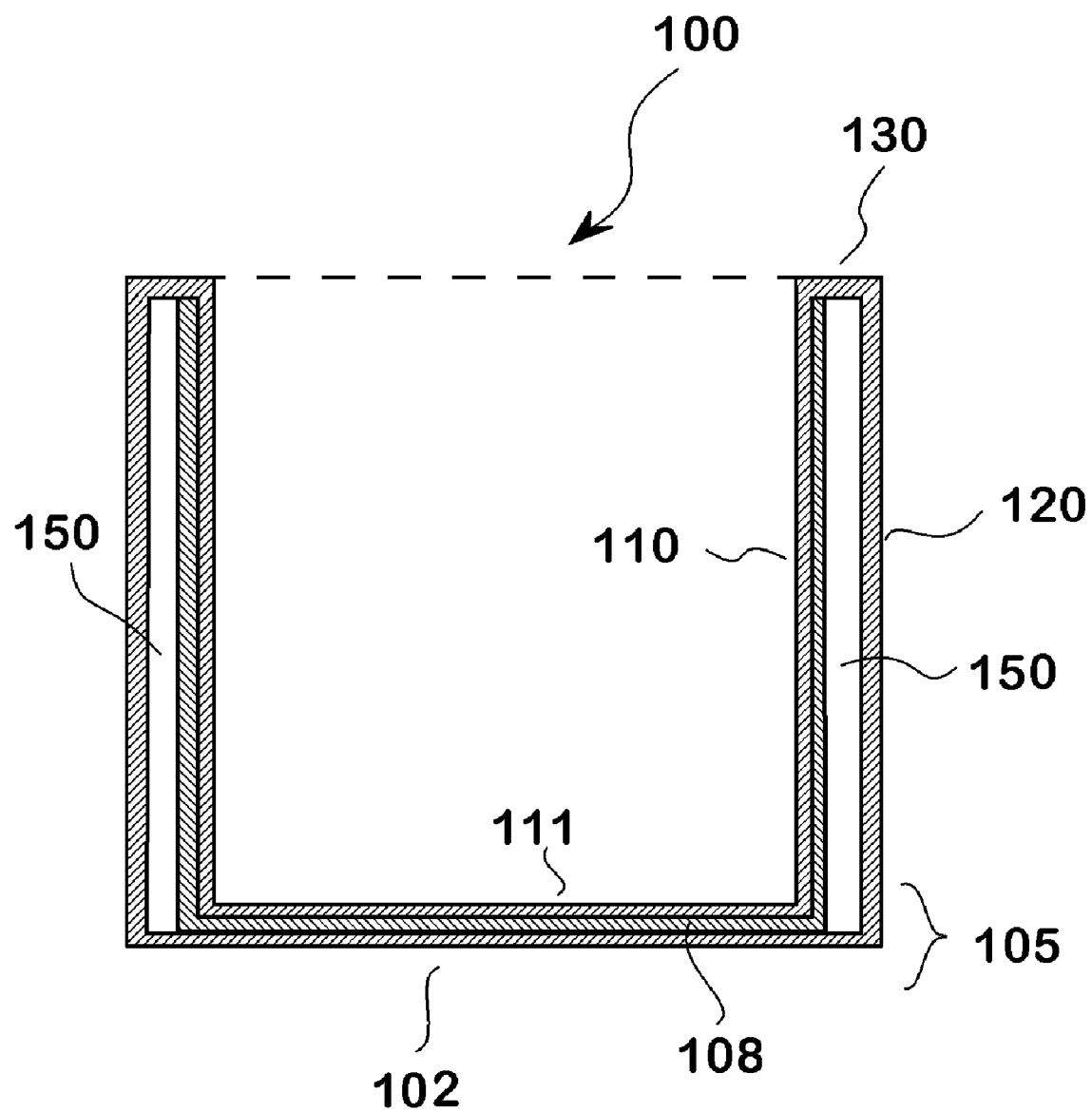
FIG. 1 is a cross-sectional elevation of a first embodiment of the invention.

Referring to FIGS. 1 through 6, wherein like reference numerals refer to like components in the various views, there is illustrated therein a new and improved insulated cooking vessel, generally denominated 100 herein.

In accordance with the present invention, FIG. 1 illustrates a first embodiment wherein a dual wall cooking vessel 100 comprises an inner shell 110 and outer shell 120. Each of the inner 110 and outer shell 120 include a substantially horizontal bottom cooking surface 102 and substantially upright and surrounding vertical walls formed by the walls of the inner and outer shells 110 and 120 terminating at rim 130. The diameter of the outer shell 120 is larger than the inner shell 110 such that an insulating gap 150 is formed there between. As the inner and outer shells are preferably, but not exclusively, formed from a unitary sheet of metal, they can be considered to be integrally joined at rim 130. The bottom of the inner shell 110 and the outer shell 120 are joined to form a unitary bottom portion of the cooking vessel 105. In a most preferred embodiment, the inner shell 110 has a laminated construction wherein the inner cooking surface 111 is a first material, preferably stainless steel, and the surrounding laminated structure 108 is a more thermally conductive material, such as copper or aluminum, or alloys and combinations thereof. As the more thermally conductive material 108 lines both the bottom and sidewalls of the cooking vessel 100, the entire inner cooking surface 111, that is the interior bottom and interior sidewalls, are uniformly heated, as the heat is efficiently transferred through the bottom portion and sides via the thermally conductive material 108. Thus, the foodstuff cooked or heated within the cookware vessel 100 and will reach a uniform temperature faster than if the thermally conductive material did not line the inner shell 110. However the insulating gap 150 minimizes the heat transfer away from the food after cooking is complete. Further, as the more thermally conductive material 108 faces this gap, but does not continue along the exterior sidewall of shell 120, or make any direct contact therewith, it does not contribute to heat loss after cooking is complete. Thus, the cooking vessel 100 has the advantage of heating or cooking foods uniformly, but also maintaining a uniform temperature within after cooking so that the foods stays hot during serving from the same cooking vessel 100.

FIG. 2 illustrates another embodiment of the invention showing a sequence of process steps that may be used to form an article of cookware shown in FIG. 1, or in the alternative embodiments of FIGS. 3-5.

Figure 2A:
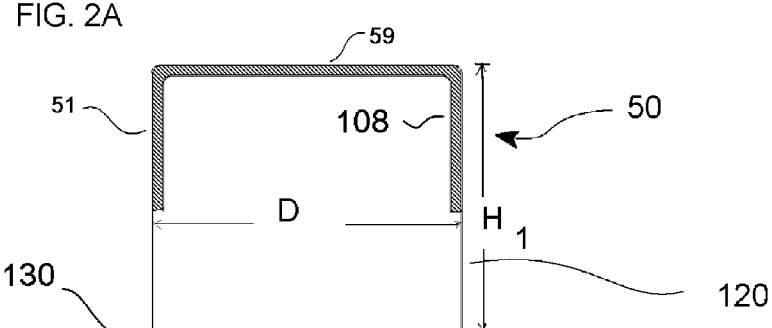
FIG. 2A-H are a sequence of cross-sectional elevations showing a method of forming one embodiment of the invention.
Figure 2B:
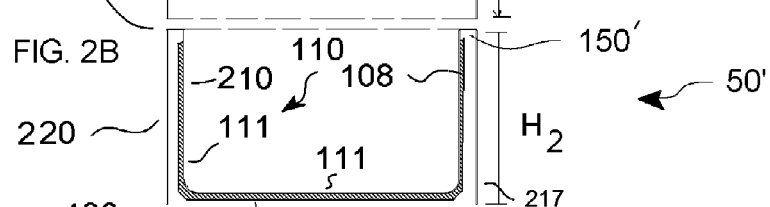
Figure 2C:
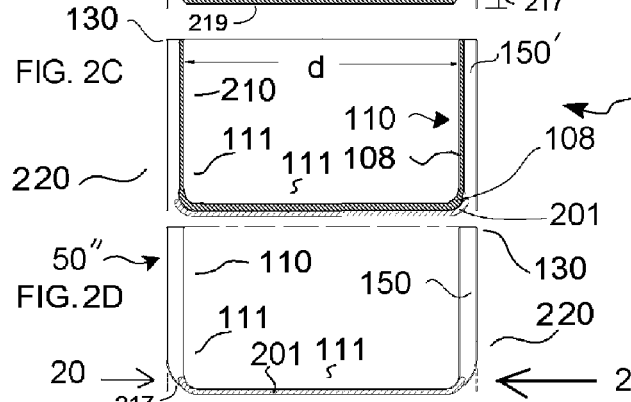

Generally, the first step in a process of forming the cooking vessel 100 at least one substantially planar sheet of metal is deep drawn to form a fluid containing pre-form vessel 50, shown in FIG. 2A. In this preferred method of creating the more thermally conductive outer layer 108 a deep drawing process is applied to a pair of stacked planar metal sheets or discs, with the smaller diameter sheet sized to form the more thermally conductive lining 108 and the larger diameter sheet intended to form both the inner shell 110 and walls 220 of the outer 120 shell and their integrally connected rim 130. The inner and outer discs can be bonded by rolling, laminating or braising as well as bonded during the deep drawing process. The initial drawing step results in the high walled pre-form vessel 50 having diameter D and wall height $H_1$, shown in FIG. 2A. The pre-form vessel 50 is shown inverted, that is with rim pointing downward and bottom 59 pointing upward.

Following the creation of pre-form vessel 50, a reverse drawing process deforms the bottom portion 59 inward, which is downward in the illustration, such that the bottom 59 and a portion of the surrounding walls 51 are inverted to form the work piece 50', which has the nascent interior cooking surface 111 and inner walls 210 of shell 110 as well as the outer wall 220 of outer shell 120. The rim 130 integrally connects to the inner shell 110 to the outer wall 220 of outer shell 120. This inverted drawing process provides an open gap 150' between the inner upright walls 210 and outer wall 220.

It should be noted that the drawing die used to form the inner walls 210 has a smaller diameter than the pre-form vessel 50 formed in the first step in the drawing process. Thus, the work piece 50', shown in FIG. 2B, has an outer diameter D, that is substantially the same as vessel 100, with an inner diameter d between the inner wall 210. Further, the wall height of work piece 50' is now reduced to $H_2$, which is less than about half the initial wall height of the preform vessel 50 in FIG. 2A. It should be noted there is now a gap 150' between the inner wall 210 and outer wall 220, which are substantially parallel to each other.

Figure 2D:
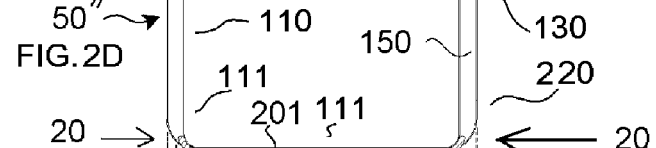
Figure 2E:
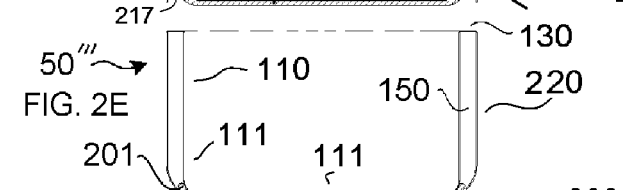
Figure 2F:
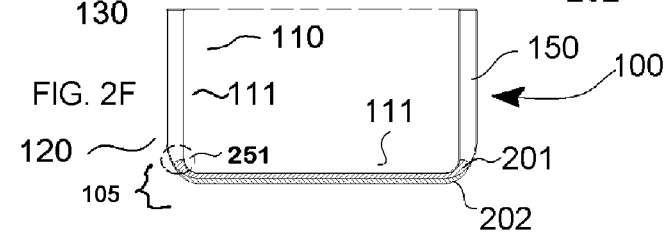
Figure 2G:
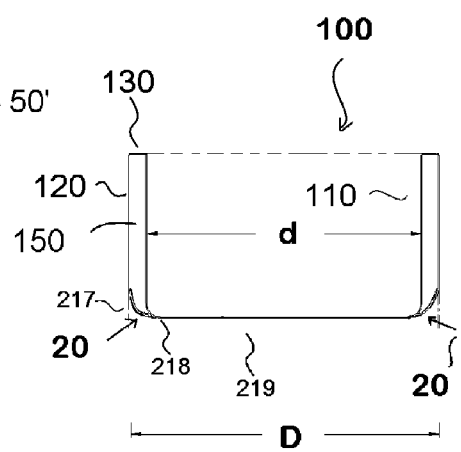

In one alternative embodiment it is possible to form a completed dual wall vessel 100 from the work piece 50', as shown in FIG. 2G. This can be accomplished by "necking' or drawing inward, as shown by arrows 20, what is now the circumferential lower portion 217 of the outer wall 220 to the exterior bottom surface 219, bonding these portions together at seam 218 to seal the cavity 150 associated with gap 150'. This step of bonding may be performed by braising or welding and the like.

However, more preferred methods are shown in FIG. 2C-2F in which a first bottom plate or dish 201, is optionally spot welded or otherwise attached to the exterior bottom surface 219 of the work piece 50' forming work-piece 50". Next, as shown in FIG. 2D, the lower portions 217 of the outer wall 220 are "necked" or deformed inward as indicated by reference arrow 20 along the entire perimeter of the work piece 50" overlapping the perimeter of the first bottom plate 201.

It should be noted that plate or dish 201 preferably has an outward concavity matching the exterior bottom disk 219, rather than being a flat plate. In the next step, as shown in FIG. 2E, a second bottom disk or plate 202, such as another aluminum plate, is attached in concentric alignment with the first bottom dish 201 at the bottom of the work piece 50" to form work piece 50'''. A presently preferred method of initial attachment is spot welding, followed by impact bonding. It should be appreciated that the second bottom disk 202 in this more preferred embodiments has a diameter sufficient to surround the necked in lower portion 217 of the outer wall 220 for eventual bonding thereto.

Figure 2H:
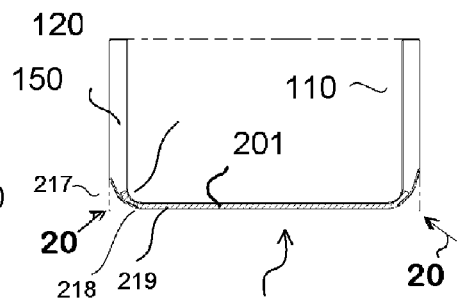
Figure 6:
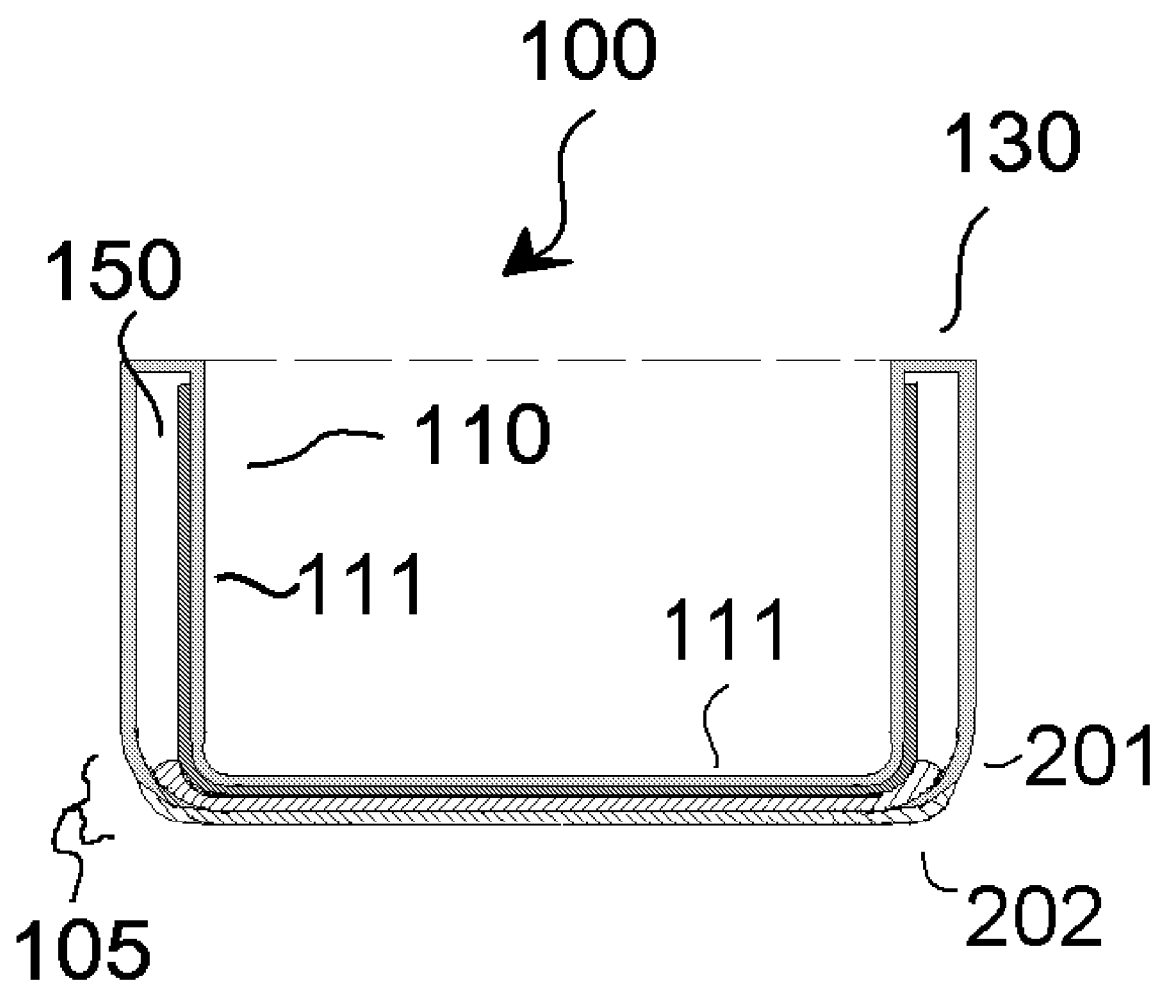
FIG. 6 is a cross-sectional elevation of another alternative embodiment of the invention.

Optionally, as shown in FIG. 2H, the lower portion 217 of outer wall 220 can necked in and subsequently bonded at seam 518 to the first bottom dish 201 to seal the cavity 150 to completes another embodiment of a cooking vessel 100. This step of bonding may be performed by braising or welding and the like.

It should also be appreciated that impact bonding is also the preferred means to join the second disk or dish 202 in the step shown in FIG. 2E when the first bottom disk 102 is relatively ductile aluminum disc. Impact bonding locks the lower portion 217 outer wall 220 between first 210 and second 202 bottom discs or plates, integral bottom portion 105 of the cooking vessel 100, as shown in FIG. 2F, sealing the cavity 150 between the parallel sidewalls formed in the step shown in FIG. 2B. It is further preferable in this step to heat at least the bottom portion of preform 50''' to a high temperature to assure sufficient plasticity of the aluminum so that it will flow between the inner shell 110 and the outer shell 120 and partially moving upward in gap 150. However it should be appreciated that the bottom portions of the inner 110 and outer 120 shells are optionally joined together by other means such as brazing or welding to each other or a third intermediate structure.

Alternatively, first disc 201 can be a shallow concave dish with sidewalls that extend the desired height to fill the lower portion 251 of gap 150. Either method provides a thick interlayer of a thermally conductive material to fill the bottom portion 251 of the gap 150 between the inner and outer vessel at the margin between bottom cooking surface and surrounding sidewalls. Fillings a lower portion of the sidewalls between the inner 110 and outer shell 120 in the above, or any other manner, provides sufficient thermal mass to avoid damage or discoloration from the heating element or flame. It should be appreciated that although impact bonding provides this significant benefit when the first bottom disk 201 is aluminum, impact bonding need not be the exclusive means adjoining a first bottom disk of aluminum, or any other material, with a second bottom disk of an other material. The cooking vessel of FIG. 2G is shown schematically in FIG. 6 to emphasize the preferred structure of the integral bottom 105.

FIG. 3A illustrates a dual wall cooking vessel having the more thermally conductive material 108 form the exterior bottom of the cooking vessel 102, as might be desirable when this more thermally conductive material is copper. This structure can be achieved in the previously described alternative methods wherein the first and second bottom disks are not required to seal the inner gap 150, as shown by FIG. 2G. Alternatively, copper disks, or any combination of the copper disk with another material, could alternatively be brazed together to create a thicker bottom portion of cooking vessel 100.

As will be evident from FIG. 3C, showing the junction between the interior cooking surface 111 and the inner shell 110 wall that extends upward, the exterior cladding 108 of the inner shell 100 extends across the exterior bottom cooking surface being either a portion of the sidewall that was drawn inward, as shown in FIG. 2F, or alternatively attached after a separate drawing process. FIG. 3D illustrates in more detail the rim portion 130 of the cooking vessel 100 above gap 150. It can also be seen in this embodiment that the outer cladding 108 of the inner shell 110 does not extend upward to reach the interior top of the cavity 150 to the rim 130, but rather terminates just below the rim 130. This facilitates the double drawing operation illustrated with respect to FIG. 2B. Further, by terminating the outer cladding 108 of the inner shell 110 just below the rim 130, the rim 130 remains cooler during cooking. This facilitates handling, but also prevents further heat, as would occur after cooking through the more thermally conductive outer cladding 108 if it extended to outer shell 120. In this embodiment the stainless steel that forms the inner and outer shells 110 and 120 preferably has a thickness of about 0.5 mm. The copper that forms the thermally conductive outer cladding 108 preferably has a thickness of about 1.0 to 1.2 mm.

FIG. 4A illustrates another dual wall cooking vessel wherein the exterior bottom cooking surface 102 is a different material than the thermally conductive material used to line the outer portion of the inner shell. Thus, in FIG. 4C, bottom plate 103 is below the outer cladding 108 that surrounds the inner shell 110. For example, it would be desirable in some instances to provide an exterior bottom cooking surface 103 wherein the unitary bottom portion 105 containing at least one ferromagnetic material, such as bottom plate 103 so that cooking vessel 100 can be used on an induction stove. One means of providing a ferromagnetic material in the exterior bottom cooking surface is by lamination as shown in FIG. 2F. Alternatively, the ferromagnetic material can be attached to the exterior bottom cooking surface of the vessel shown in FIG. 3A by a subsequent step of either impact bonding, brazing or embedding a discontinuous layer of ferromagnetic material such as a mesh or grid.

FIG. 5A-D illustrates an alternative method of forming the cookware vessel 100. In FIG. 5A a substantially round or oval blank of clad metal sheet 510 has an upper layer 505 and a lower layer 508. At least a portion of layer 508 is intended to form the more thermally conductive layer 108 that clads or is laminated to the inner shell 110. Layer 505 is preferably stainless steel of about 0.5 to 0.6 mm thick, whereas layer 508 is preferably at least one of aluminum and copper that is about 0.8 to 2 mm thick. In FIG. 5B partially clad sheet 510' has a upper sheet 505' and a narrower lower layer 508'. The lower layer 508' has been narrowed by machining away material from layer 508 of sheet 510. Alternatively, the clad sheet combination 510' can be formed by bonding two disks of different diameters together, such as by explosive or impact bonding, as well as by repeated rolling operations or brazing.

Next, as shown in FIG. 5C, sheet 510' has been deformed by deep drawing to form the inner shell 513, having a bottom 503, surrounding sidewall 503 terminating at an outward flared rim 530. An outer vessel or shell 520, having a bottom 523 and surrounding sidewall 522, is then joined to the inner shell 520, by sealing its rim 533 to flared rim 530, forming wall cavity 150 in vessel 100.

It is also preferable that another metal plate or disc 583 is bonded between the inner shell 513 and outer shell 520 by impact bonding prior to the attachment of rims 530 and 533, forming vessel 100 in FIG. 5D.

Again it should be emphasized that the cooking vessels 100 illustrated with respect to FIG. 1, 3-5 need not be fabricated exclusively by the process shown in FIGS. 2 and 5. Further, it should be appreciate that bottom disks 201 and 202 are optionally any combination of thermally conductive material such as copper and aluminum, and may also comprise either a layer or mesh of a ferromagnetic material for induction cooking.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A method of forming a cooking vessel, the method comprising the steps of:
    a) providing a first vessel having a bottom surface surrounded by substantially upright walls which comprises an outer shell and an inner lining, the first vessel having a first portion and a second portion, the first portion being the portion thereof in which the inner lining covers an interior bottom surface of the outer shell and extends only partially upward along an interior of the outer shell and the interior of the bottom surface, the second portion being the unlined upper extent of the outer shell that is beyond the first portion,
    b) drawing the first vessel to reverse the inner lining to surround an exterior of the outer shell in the first portion to form a cooking vessel wherein the second portion of the outer shell first extends circumferentially outward from the inner lining and then downward, being substantially parallel to the first portion to provide an outer wall whereby a gap is formed between the outer wall formed from the second portion and an inner wall formed from the first portion, wherein the inner lining faces the gap,
    c) attaching a lower extent of the second portion to the bottom of the cooking vessel thereby sealing the gap formed between the first and second portions.

2. A method of forming a cooking vessel according to claim 1 further comprising the step of attaching a first metal cap to the bottom of the cooking vessel wherein the lower extent of the second portion of the cooking vessel is attached to the first metal cap.

3. A method of forming a cooking vessel according to claim 2 further comprising the step of attaching a second metal cap to the first metal cap at the bottom of the cooking vessel wherein the lower extent of the second portion of the cooking vessel is bonded between the first and second metal caps.

4. A method of forming a cooking vessel according to claim 3 wherein the first metal cap comprises aluminum or an alloy thereof and said step of the attaching the lower extent of the second portion to the bottom of the cooking vessel comprises impact bonding to extrude at least a portion of the aluminum first metal cap into the lower portion of the gap adjacent the first metal cap.

5. A method of forming a cooking vessel according to claim 3 wherein the first metal cap conforms to the exterior bottom before attachment thereto and the second metal cap is deformed.

6. A method of forming a cooking vessel according to claim 3 wherein the second metal cap is copper and the first metal cap is aluminum.

7. A method of forming a cooking vessel according to claim 3 wherein the first metal cap is spot welded to the exterior bottom of the cooking vessel before impact bonding.

8. A method of forming a cooking vessel, the method comprising the steps of:
    a) providing a first vessel having a bottom with an interior and an exterior surface surround by substantially upright surrounding walls,
    b) drawing a portion of the bottom upward into an interior region between the substantially upright surrounding walls to invert at least about half the height of the surrounding walls so that the interior bottom surface becomes the interior bottom surface of a second cooking vessel, the second vessel having a substantially parallel interior and external walls connected at an upper rim of the second vessel to provide a circumferential gap there between, c) sealing the gap formed between the interior and exterior walls thereof.

9. A method of forming a cooking vessel according to claim 8 wherein said step of sealing the gap comprises attaching a lower extent of the exterior wall to the exterior bottom of the second cooking vessel.

10. A method of forming a cooking vessel according to claim 8 wherein said step of sealing the gap comprises attaching a first metal cap to the bottom of the second cooking vessel wherein a lower extent of the second portion of the second cooking vessel is attached to the first metal cap.

11. A method of forming a cooking vessel according to claim 8 wherein the first vessel has a laminated construction wherein the interior bottom surface is a first material and the exterior bottom surface is a more thermally conductive material than the first material.

12. A method of forming a cooking vessel according to claim 10 further comprising the step of attaching a second metal cap to the first metal cap at the bottom of the second cooking vessel wherein the lower extent of the second portion of the second cooking vessel is bonded between the first and second metal cap.

13. A method of forming a cooking vessel according to claim 10 wherein the first metal cap is spot welded to the exterior bottom of the second cooking vessel before impact bonding.

14. A method of forming a cooking vessel according to claim 10 wherein the first metal cap is a ferromagnetic material.

15. A method of forming a cooking vessel according to claim 10 wherein the first vessel has a laminated construction wherein the interior bottom surface is a first material and the exterior bottom surface is a more thermally conductive material than the first material.

16. A method of forming a cooking vessel according to claim 12 wherein the first metal cap conforms to the exterior bottom before attachment thereto and the second metal cap is deformed.

17. A method of forming a cooking vessel according to claim 12 wherein the second metal cap is copper and the first metal cap is aluminum.

18. A method of forming a cooking vessel according to claim 12 wherein the first metal cap is a ferromagnetic material.

19. A method of forming a cooking vessel according to claim 12 wherein at least one of the first and second metal caps is selected from the group consisting of copper and aluminum.

20. A method of forming a cooking vessel according to claim 11 wherein the first material is stainless steel and the more thermally conductive material comprises one or more layers of at least one of copper and aluminum.

* * * * *